Oct. 4, 1932.    G. CAMPU    1,881,309
TIRE
Filed May 24, 1932
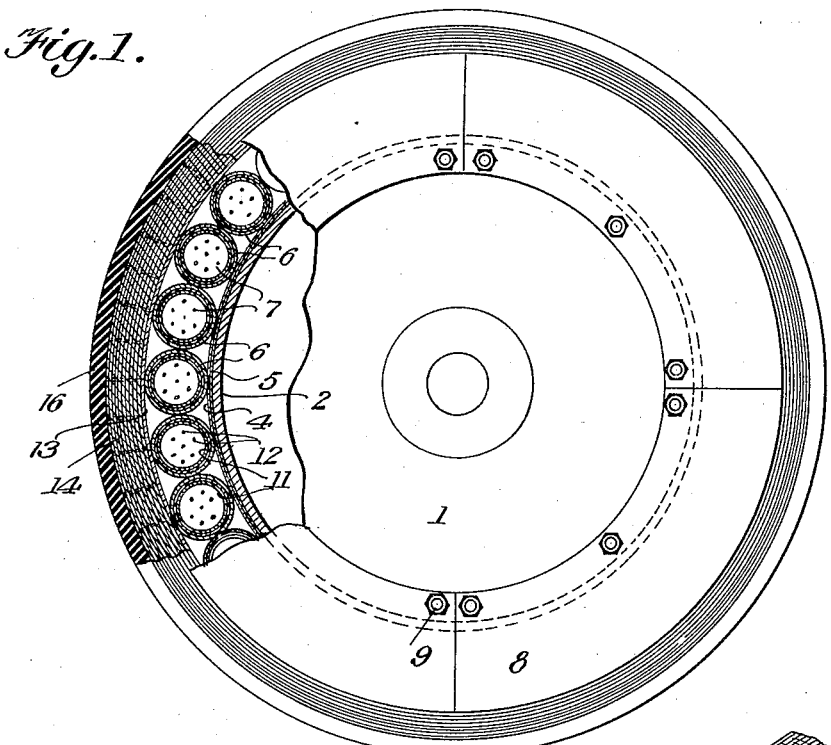
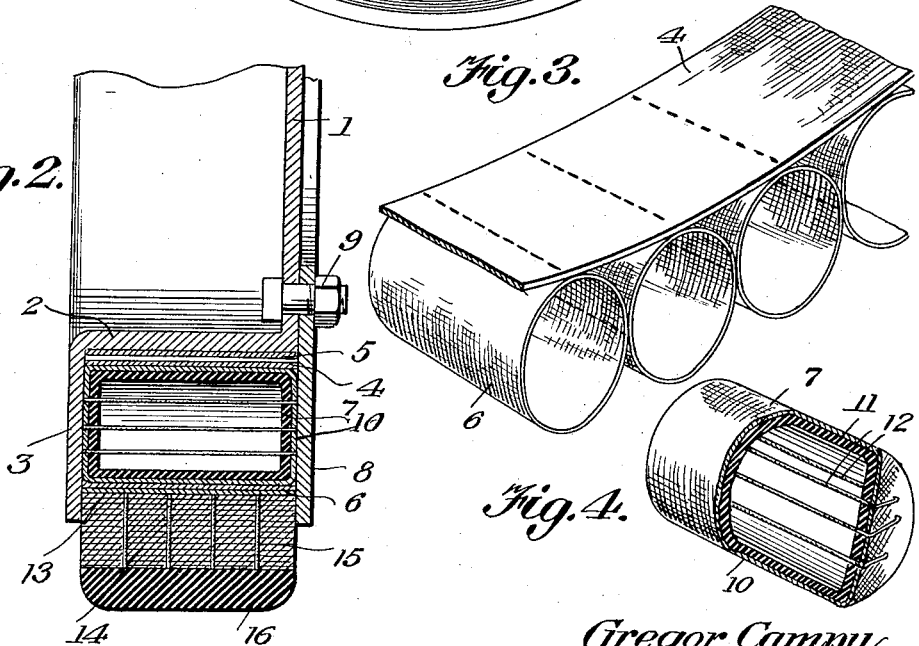
Gregor Campu
INVENTOR
BY Victor J. Evans
&Co.
ATTORNEYS Patented Oct. 4, 1932

1,881,309

UNITED STATES PATENT OFFICE

GREGOR CAMPU, OF DETROIT, MICHIGAN

TIRE

Application filed May 24, 1932. Serial No. 613,256.

This invention relates to vehicle tires, and one of its objects is to provide a pneumatic tire which includes a plurality of individual separated pneumatic cushion tubes adequately protected to prevent the puncture thereof, but in the event one or two of the tubes become punctured, the tire in its entirety would not be materially impaired, and the construction permits the replacement of the tubes in an expeditious manner with very little effort on the part of the operator, and without removing the tire from its rim.

A further object of the invention is to provide a pneumatic tire possessed of great resiliency capable of absorbing maximum shocks as well as to withstand hard usage and is also susceptible of being quickly and inexpensively repaired.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation of my tire and wheel therefor, with parts broken away to better illustrate the construction.

Figure 2 is a fragmentary transverse sectional view taken through the tire and its rim and wheel.

Figure 3 is a perspective view of a portion of the tube holding member.

Figure 4 is a similar view of a tube with its walls broken away.

It will be noted upon referring to the drawing in detail that I have shown my novel tire applied to a disk wheel, but it will be obvious that it can be used with any type wheel, and in the present instance, the disk 1 is bent at right angles upon itself to provide a rim 2 having a flange 3 extending outwardly therefrom as best shown in Figure 2 of the drawing.

The tire includes an annular band 4 adapted to repose upon a protective band 5 surrounding the rim 2, and secured transversely to said band 4 by a plurality of hollow cylindrical members 6 which are also laterally secured to each other as shown in Figure 3 of the drawing. The cylindrical members 6 provide compartments for pneumatic tubes 7 and each member receives a tube which is held therein by a rim plate 8 detachably secured to the disk by bolt and nut connections 9, and which extends outwardly in parallelism to the flange 3 so that the flange 3 and plate 8 provide a channel for receiving the tire as clearly shown in Figure 2 of the drawing. The tubes include a fabric casing 10 lined with flexible material 11 such as rubber and passing longitudinally through the tubes 7 and fixed to the end walls thereof are cords 12 which are adapted to hold and retain the tubes in their cylindrical formation as best shown in Figure 4 of the drawing.

The tire also includes a band 13 engaging the outer surfaces of the hollow cylindrical member 6 and arranged exteriorly of the band 13 are a plurality of layers of fabric 14 held together by cords 15. Vulcanized or otherwise secured to the outer layer is the tread 16. The tubes 7 are inflated to an extent to give the desired cushion effect to the tire and they cooperate with the remaining portion of the tire so as to provide a tire having maximum riding qualities.

From the above description and disclosure in the drawing, it will be obvious that the tubes 7 are removable, and while these tubes are adequately protected against puncture or other damage, in the event that one of the tubes should become punctured, the rim plate 8 can be removed and the damaged tube replaced without removing the tire from its rim 2.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a vehicle wheel, a rim, a flange formed with said rim, a tube carrying member adapted to be positioned on the rim, pneumatic tubes arranged transversely of the rim and disposed in the tube carrying member, a treaded means surrounding said tube carrying member and means detachably secured to said wheel and arranged in parallelism with the flange to hold the tubes and remaining tire parts in operative position.

2. In a vehicle wheel, a rim, a flange formed with said rim, a tire carried by said rim and including a band surrounding said rim, a plurality of cylindrical members secured to said band and to each other, a treaded means surrounding said cylindrical members, pneumatic tubes arranged in said cylindrical members and means detachably secured to said rim and arranged in parallelism with the flange for securing said tubes and treaded member in operative position.

3. A tire of the character described comprising a plurality of cylindrical members, secured together in row formation, a band secured to said cylindrical members, and adapted to surround a tire rim, a treaded member including a plurality of layers of fabric surrounding the cylindrical members, a tread on said treaded member and pneumatic tubes detachably arranged in the cylindrical members.

4. A tire of the character described comprising an annular band, a plurality of hollow cylindrical members secured to said band, pneumatic tubes arranged in said cylindrical members and including a fabric covering provided with a lining formed from flexible material, cords passing through said pneumatic tubes for holding the same in cylindrical formation, and a treaded member surrounding said cylindrical members.

5. A tire of the character described comprising an annular band, cylindrical members secured in row formation transversely of said band, pneumatic tubes detachably arranged in said cylindrical members and being of cylindrical formation, means for holding said tubes in said cylindrical formation, and a treaded member including a plurality of layers of fabric arranged in superposed relation and secured together and a tread for said treaded member.

In testimony whereof I affix my signature.

GREGOR CAMPU.